United States Patent [19]
Oltendorf

[11] 4,333,045
[45] Jun. 1, 1982

[54] ACCELERATION SHAPING CIRCUIT FOR A STEPPER MOTOR

[75] Inventor: Norman E. Oltendorf, Algonquin, Ill.

[73] Assignee: Bodine Electric Company, Chicago, Ill.

[21] Appl. No.: 185,022

[22] Filed: Sep. 8, 1980

[51] Int. Cl.³ .......................................... G05B 19/45
[52] U.S. Cl. ................................. 318/696; 318/416
[58] Field of Search ............... 318/415, 416, 685, 696

[56] References Cited
U.S. PATENT DOCUMENTS

| | | | |
|---|---|---|---|
| 3,411,058 | 11/1968 | Madsen et al. | 318/696 |
| 3,963,971 | 6/1976 | Leenhouts et al. | 318/696 |
| 4,016,472 | 4/1977 | Leenhouts | 318/696 |
| 4,119,902 | 10/1978 | Newell | 318/696 |

OTHER PUBLICATIONS
Sigma Stepping Motor Handbook, pp. 1-61.

Primary Examiner—Gene Z. Rubinson
Attorney, Agent, or Firm—Allegretti, Newitt, Witcoff & McAndrews

[57] ABSTRACT

An acceleration shaping circuit for a stepper motor is described and includes two voltage storage devices. One is charged linearly and the other is charged exponentially. The output ramp voltage is an adjustable combination of the two stored voltages and is therefore variable between a linear ramp voltage and an exponential ramp voltage.

10 Claims, 2 Drawing Figures

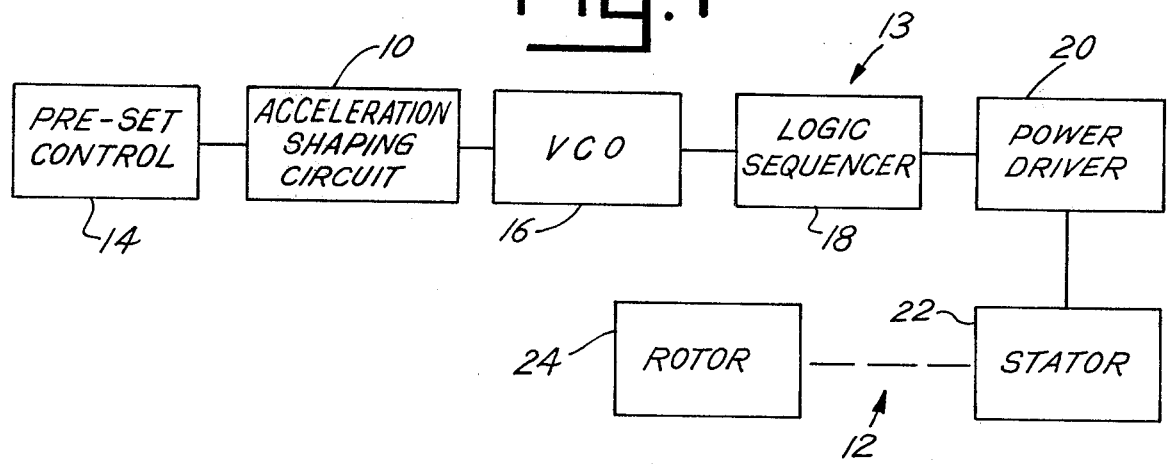
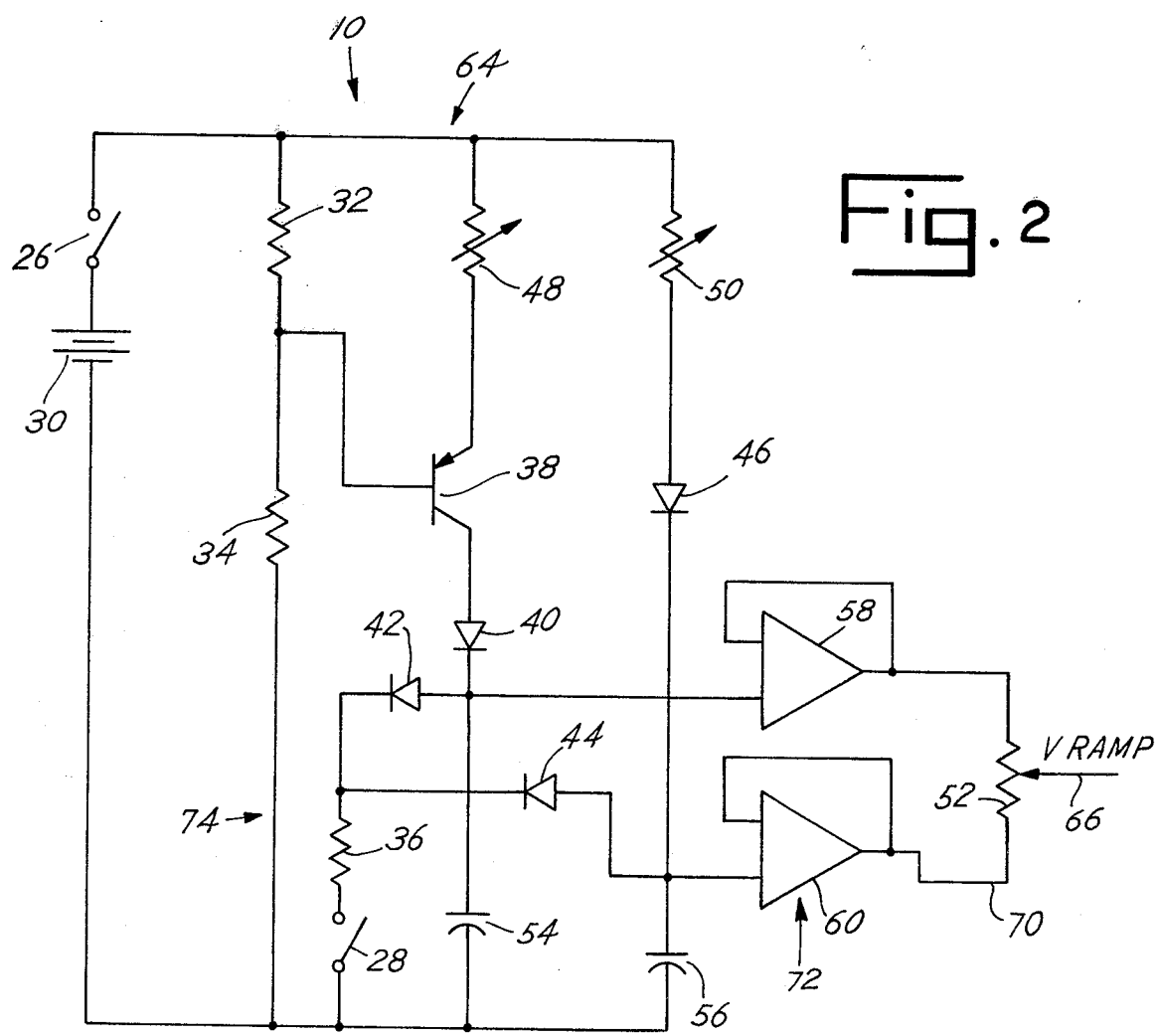

4,333,045

ACCELERATION SHAPING CIRCUIT FOR A STEPPER MOTOR

BACKGROUND AND SUMMARY OF THE INVENTION

The present invention relates generally to a stepper motor and more particularly to an acceleration shaping circuit for a stepper motor.

Stepper motors are operable in a low speed mode and a high speed, or slew, mode. To operate in the slew mode, the stepper motor must be accelerated from the low speed to the slew speed. This acceleration is generally known as "ramping".

With the presently available stepper motors and associated control electronics, ramping is either linear or exponential. But, due to variations in load, the speed/torque characteristics of the stepper motor, and the operative speed range of the stepper motor, there is no single preferred ramp shape. That is, the preferred acceleration is a function of system and load parameters and depends highly upon load friction and inertia.

In a principal aspect, the present invention is an improved acceleration shaping circuit for a stepper motor. The acceleration shaping circuit permits the operator of the stepper motor to vary or adjust the ramp shape and thereby substantially optimize the operation of the stepper motor in each particular application thereof.

The acceleration shaping circuit includes a power supply, a source circuit providing a substantially constant current when coupled to the power supply, a first and second voltage storage device, a first resistance element and first adjustable resistance element. The first voltage storage device is connected to the source circuit and charges in a linear fashion in response thereto. The voltage across the first voltage storage device therefore increases linearly.

The second voltage storage device is connectable to the power supply through the first resistance element. When connected, the second voltage storage device charges exponentially to provide an exponentially increasing ramp voltage.

The first adjustable resistance element has a pair of end terminals and a wiper. The end terminals are connected to the first and second voltage storage devices, respectively.

A variable ramp voltage is available at the wiper. The variable ramp voltage is adjustable between the substantially linear ramp voltage at one terminal end, derived from the first voltage storage device, and the substantially exponential ramp voltage at the other terminal end, derived from the second voltage storage device. By appropriately moving the wiper, i.e., by adjusting the first adjustable resistance element, the preferred acceleration voltage is provided and the acceleration ramp is optimally matched to the load.

It is thus an object of the present invention to provide an improved acceleration circuit for a stepper motor. Another object is a stepper motor acceleration circuit for producing a variable ramp voltage. It is also an object of the present invention to provide an acceleration shaping circuit wherein the output ramp voltage is adjustable between a linear ramp voltage and an exponential ramp voltage so as to accommodate varying applications of the stepper motor.

Still another object is an adjustable acceleration shaping circuit whereby the acceleration of the stepper motor to slew speed is substantially optimized. It is a further object to provide a stepper motor acceleration shaping circuit whereby the transistion or acceleration time is substantially minimized. Yet another object is a simple, readily manufactured and maintainable acceleration shaping circuit.

These and other objects, features, and advantages of the present invention are described or apparent in the following detailed description.

BRIEF DESCRIPTION OF THE DRAWING

A preferred embodiment of the present invention is described herein, in detail, with reference to the drawing, wherein:

FIG. 1 is a schematic block diagram of a stepper motor including a preferred embodiment of the present invention; and FIG. 2 is a schematic diagram of the preferred embodiment shown in FIG. 1.

DESCRIPTION OF A PREFERRED EMBODIMENT

Referring to FIGS. 1 and 2, a preferred embodiment of the present invention is shown as an acceleration shaping circuit 10 for a stepper motor, generally designated 12. As shown, the acceleration shaping circuit 10 is a part of the stepper motor electronics, generally designated 13, which further includes a pre-set control 14, a voltage controlled oscillator 16, a logic sequencer 18 and a power driver 20. The stepper motor 12, including a stator 22 connected to the power driver 20 and a rotor 24, is operable at a low speed and a high, slew speed, as determined by the pre-set control 14.

More particularly, the windings of the stator 22 (not shown) are appropriately driven or energized by the power driver 20 under the control of the logic sequencer 18. The timing or speed of the power driver 20 corresponds to the frequency of the voltage controlled oscillator 16. The oscillator 16 is responsive to the acceleration shaping circuit 10, or more particularly the output voltage thereof. In the low speed mode, the acceleration shaping circuit 10 provides a low, constant output voltage through additional hardware (not shown). In high speed operation, the output voltage is again constant but has a greater magnitude than in the low speed mode.

The acceleration shaping circuit 10 also controls the shape of the ramp or acceleration voltage applied to the voltage controlled oscillator 16 during transistion from low speed to high speed, and vice versa. This ramp voltage, applied to the voltage controlled oscillator 16, is adjustable between a substantially linear ramp voltage and a substantially exponential ramp voltage. In this preferred embodiment of the present invention, the rate of increase of the ramp voltage, as well as the shape, is adjustable.

The pre-set control 14 of the stepper motor electronics 13 controls the operational state of the stepper motor 12. For example, the pre-set control 14 initiates both acceleration and deceleration of the stepper motor 12. In this preferred embodiment, the pre-set control 14 includes cooperating switches 26, 28, shown in FIG. 2. Whenever the switch 26 is open, the switch 28 is closed, and vice versa. Although mechanical switches 26, 28 are shown, it is to be understood that any equivalent thereto, e.g., a transistor, may be utilized.

The acceleration shaping circuit 10 includes a power supply 30, resistors 32, 34, 36, transistor 38, diodes 40, 42, 44, 46, potentiometers 48, 50, 52, capacitors 54, 56 and operational amplifiers 58, 60, interconnected as shown. The resistors 32, 34, transistor 38 and potentiometer 48 define, in cooperation, source means, generally designated 64, for adjustably generating a substantially constant current through the diode 40, when coupled to the power supply 30. The voltage division between the resistor 32, 34 provides a reference voltage biasing the transistor 38 into conduction. The current level is adjusted by the potentiometer or adjustable resistance element 48.

As shown, the source means 64 is coupled or connected to the capacitor or first voltage storage means 54. The capacitor 54 receives the constant current therefrom and responsively charges in a substantially linear fashion. That is, the voltage across the capacitor 54 increases linearly with time. The rate of increase depends upon the amount of current generated by the source means 64, as regulated by the potentiometer 48.

The capacitor or second voltage storage means 56 is connected to the power supply 30 through the diode 46, the potentiometer or adjustable resistance element 50, and the switch 26. When coupled thereto, the capacitor 56 is charged by a resulting current in a substantially exponential fashion. The rate of exponential increase is varied by adjusting the potentiometer 50.

As shown in FIG. 2, the capacitors 54, 56 are connected to the potentiometer or adjustable resistance element 52 through the operational amplifiers 58, 60, respectively. More particularly, the potentiometer 52 includes a wiper 66, a first end terminal 68 and a second end terminal 70. The capacitor 54 is connected to the first end terminal 68 through the operational amplifier 58, and the capacitor 56 is connected to the second end terminal 70 through the operational amplifier 60.

The amplifiers 58, 60 cooperatively define operational amplifier means, generally designated 72, for impedance transforming the voltages stored on the capacitors 54, 56. The amplifier means 72 provides a low impedance drive source while sufficiently isolating the potentiometer 52 from the capacitors 54, 56. The potentiometer 52 therefore has substantially no effect upon the charging of the capacitors 54, 56.

The amplifiers 58, 60 are essentially unity gain amplifiers. In this preferred embodiment, however, the gain of the amplifier 58 is slightly greater than one to adjust for the small voltage drop across the transistor 38. As such, the peak voltages stored on the capacitors 54, 56 and transformed by the operational amplifier means 72 are substantially equal.

The variable ramp voltage, received by the voltage controlled oscillator 16, is available at the wiper 66. The ramp voltage is adjustable, depending on the position of the wiper 66, between the substantially linear ramp voltage at the first end terminal 68 and the substantially exponential ramp voltage at the second end terminal 70. The variable ramp voltage, designated Vramp in FIG. 2, permits the user of the stepper motor to optimize acceleration in each particular application and to substantially minimize the period of transition between low speed and high speed operation of the stepper motor 12.

After a predetermined amount of time at slew speed, the pre-set control 14 opens the switch 26 and closes the switch 28. The capacitors 54, 56 then discharge through the resistor 36 at substantially the same exponential rate. The resistor 36 thus defines discharge means, generally designated 74, connectable to the first and second voltage storage means 54, 56 for discharging thereof. It should be understood that the discharge means 74 may include alternative components such as a transistor to provide a substantially linear discharge.

In this preferred embodiment, and as shown by the interconnecting broken line in FIG. 2, the potentiometers 48, 50 are operated off a common shaft (not shown) to provide a corresponding rate-of-increase relationship between the linear ramp voltages and the exponential ramp voltage. That is, both voltages increase more rapidly with an appropriate adjustment of the common shaft. This common adjustment, in contrast to an individual adjustment of the potentiometer 48, 50, facilitates matching of the preferred acceleration voltage of the load.

A single preferred embodiment of the present invention has been described herein. It is to be understood that various changes and modifications can be made without departing from the true scope and spirit of the present invention, as defined by the following claims. These claims are to be interpreted in light of the foregoing specification.

What is claimed is:

1. An acceleration shaping circuit for a stepper motor, said acceleration shaping circuit providing a variable ramp voltage, comprising, in combination:

a power supply;

source means, couplable to said power supply, for providing a substantially constant current;

first voltage storage means, coupled to said source means, for receiving said substantially constant current, said first voltage storage means charging substantially linearly in response thereto to provide a substantially linear ramp voltage;

a first resistance element;

second voltage storage means, coupled to said first resistance elements and couplable to said power supply, for receiving a current from said power supply through said first resistance element, said second voltage storage means charging substantially exponentially in response thereto to provide a substantially exponential ramp voltage; and a first adjustable resistance element having a first end terminal, a second end terminal and a wiper, said first end terminal being coupled to said first voltage storage means and said second end terminal being coupled to said second voltage storage means, said variable ramp voltage being available at said wiper and being variable between said substantially linear ramp voltage across said first voltage storage means and said substantially exponential ramp voltage across said second voltage storage means.

2. An acceleration shaping circuit as claimed in claim 1 wherein said source means is adjustable to vary the magnitude of said substantially constant current.

3. An acceleration shaping circuit as claimed in claim 2 wherein said source means includes a second adjustable resistance element.

4. An acceleration shaping circuit as claimed in claims 1 or 3 wherein said first resistance element is adjustable to vary the charging rate of said second voltage storage means.

5. An acceleration shaping circuit as claimed in claim 4 wherein said first resistance element and said second adjustable resistance element are interconnected and commonly adjusted.

6. An acceleration shaping circuit as claimed in claim 3 wherein said source means further includes a transistor coupled to said second adjustable resistance element.

7. An acceleration shaping circuit as claimed in claim 1 further comprising operational amplifier means for coupling said first adjustable resistance element to said first voltage storage means and said second voltage storage means.

8. An acceleration shaping circuit as claimed in claim 7 wherein said operational amplifier means includes a first operational amplifier between said first end terminal of said first adjustable resistance element and said first voltage storage means and a second operational amplifier between said second end terminal of said first adjustable resistance element and said second voltage storage means.

9. An acceleration shaping circuit as claimed in claim 8 wherein said first and second operational amplifiers are unity gain amplifiers.

10. An acceleration shaping circuit as claimed in claim 1 further comprising discharge means couplable to said first and second voltage storage means for discharging thereof.

* * * * *